US012337500B2

United States Patent
(12) United States Patent
Morris et al.

(10) Patent No.: US 12,337,500 B2
(45) Date of Patent: Jun. 24, 2025

(54) DEVICES, SYSTEMS, AND METHODS FOR SCORCHING BOARDS AND PANELS

(71) Applicant: COLUMBIA INSURANCE COMPANY, Omaha, NE (US)

(72) Inventors: Roman Morris, Simpsonville, SC (US); Ronald L. Davis, Greenville, SC (US); Kenneth Ellington, Easley, SC (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 18/328,171

(22) Filed: Jun. 2, 2023

(65) Prior Publication Data

US 2023/0302679 A1 Sep. 28, 2023

Related U.S. Application Data

(63) Continuation of application No. 16/567,850, filed on Sep. 11, 2019, now Pat. No. 11,772,298.

(60) Provisional application No. 62/729,731, filed on Sep. 11, 2018.

(51) Int. Cl.

| | |
|---|---|
| ***B27M 1/06*** | (2006.01) |
| ***B27M 1/00*** | (2006.01) |
| ***B27M 1/08*** | (2006.01) |
| ***B44B 7/00*** | (2006.01) |
| ***B44C 1/02*** | (2006.01) |

(52) U.S. Cl.

CPC .............. *B27M 1/06* (2013.01); *B27M 1/003* (2013.01); *B27M 1/08* (2013.01); *B44B 7/00* (2013.01); *B44C 1/02* (2013.01)

(58) Field of Classification Search

None

See application file for complete search history.

(56) References Cited

U.S. PATENT DOCUMENTS

| | | | |
|---|---|---|---|
| 1,009,436 | A | 11/1911 | Partridge et al. |
| 1,758,336 | A | 5/1930 | Emil |
| 2,113,679 | A | 4/1938 | Cleff |
| 3,294,014 | A | 12/1966 | Kneisel |

(Continued)

FOREIGN PATENT DOCUMENTS

| | | | |
|---|---|---|---|
| EP | 0119801 | A2 | 9/1984 |
| GB | 2011063 | A | 7/1979 |

(Continued)

*Primary Examiner* — Alexander S Thomas

(74) *Attorney, Agent, or Firm* — Ballard Spahr LLP

(57) ABSTRACT

A system having a conveyor assembly, at least one scorching assembly, and a central controller. The conveyor assembly has a conveyor that effects movement of at least one board or panel relative to a movement axis. Each scorching assembly has a combustion chamber, at least one burner, and at least one processing unit. Each burner can be mounted to the combustion chamber and at least partially received within the combustion chamber. Each burner can be oriented toward the conveyor. The at least one processing unit can be communicatively coupled to the at least one burner and configured to selectively control activation and operation of the at least one burner. The central controller can be communicatively coupled to each processing unit of the at least one scorching assembly and configured to receive a user input corresponding to a scorching profile for the at least one board or panel.

20 Claims, 9 Drawing Sheets

(56) References Cited

U.S. PATENT DOCUMENTS

| | | | |
|---|---|---|---|
| 3,353,574 A | 11/1967 | Kvalheim et al. | |
| 3,393,294 A | 7/1968 | Cramer | |
| 3,750,303 A | 8/1973 | Gates et al. | |
| 3,895,132 A | 7/1975 | Blessinger et al. | |
| 4,170,668 A | 10/1979 | Chaiken et al. | |
| 4,181,763 A | 1/1980 | Shellenberger | |
| 4,191,795 A | 3/1980 | Lewis | |
| 4,227,558 A | 10/1980 | Bates | |
| 4,701,355 A | 10/1987 | Cottingham | |
| 5,145,537 A | 9/1992 | Senzani | |
| 6,848,396 B2 | 2/2005 | Carleson et al. | |
| 9,726,429 B1 | 8/2017 | Jamaluddin et al. | |
| 11,772,298 B1 * | 10/2023 | Morris | B44B 7/00 432/2 |
| 2005/0174244 A1 | 8/2005 | Grow | |
| 2007/0240547 A1 | 10/2007 | Dick | |
| 2018/0094230 A1 | 4/2018 | Battistutta | |
| 2018/0161809 A1 | 6/2018 | Satou et al. | |

FOREIGN PATENT DOCUMENTS

| | | |
|---|---|---|
| KR | 20140071235 A | 6/2014 |
| WO | WO 2011074991 A1 | 6/2011 |

* cited by examiner

DEVICES, SYSTEMS, AND METHODS FOR SCORCHING BOARDS AND PANELS

CROSS-REFERENCE TO RELATED APPLICATIONS

This application is a continuation of U.S. patent application Ser. No. 16/567,850, filed on Sep. 11, 2019, which claims priority to and the benefit of the filing date of U.S. Provisional Patent Application No. 62/729,731, filed Sep. 11, 2018, each of which is incorporated herein by reference in its entirety.

FIELD

This application relates generally to systems and methods for scorching boards and panels to produce desired aesthetic appearances on the boards and panels. Optionally, the disclosed systems and methods can operate in an at least partially automated manner.

BACKGROUND

Conventionally, flamed wood aesthetics in boards and panels are produced using a manual, time-consuming process that is performed by hand-manipulation of a burner. Such aesthetics cannot be reproduced efficiently—rather, a worker must manually produce these aesthetics for each respective board or panel. Consequently, no board or panel has an identical appearance, and it is difficult to produce multiple boards or panels having a consistent overall look. Additionally, given the manual nature of this process, boards or panels are often charred or burned too heavily. In these situations, the worker must attempt to re-work the boards or panels to mask the charred/burned appearance, creating additional inefficiency in the process. Further, such conventional processes are typically limited to small, solid-wood boards or panels. Large boards or panels are not easily moved or accessed in a manual process, and engineered woods are easier to burn through than solid woods, creating a high risk of burning through such boards or panels. Still further, the manual scorching process is not safe, requiring a worker to ensure that flames do not contact supply hoses and other equipment.

SUMMARY

Described herein is a system comprising a conveyor assembly, at least one scorching assembly, and a central controller. The conveyor assembly can have a conveyor configured to effect movement of at least one board or panel relative to a movement axis. Each scorching assembly can have a combustion chamber, at least one burner, and at least one processing unit. Each burner can be mounted to the combustion chamber and at least partially received within the combustion chamber. Each burner can be oriented toward the conveyor. The at least one processing unit can be communicatively coupled to the at least one burner and configured to selectively control activation and operation of the at least one burner. The central controller can be communicatively coupled to each processing unit of the at least one scorching assembly and configured to receive a user input corresponding to a scorching profile for the at least one board or panel.

Methods of using the described system are also disclosed. Optionally, the disclosed methods can comprise sequentially scorching at least two boards using the same scorching profile. Additionally, or alternatively, the disclosed methods can optionally comprise scorching a first board or panel using a first scorching profile and then scorching a second board or panel using a second scorching profile that is different than the first scorching profile.

BRIEF DESCRIPTION OF THE DRAWINGS

These and other aspects of the invention will become more apparent in the detailed description in which reference is made to the appended drawings wherein.

DETAILED DESCRIPTION

Figure 1:
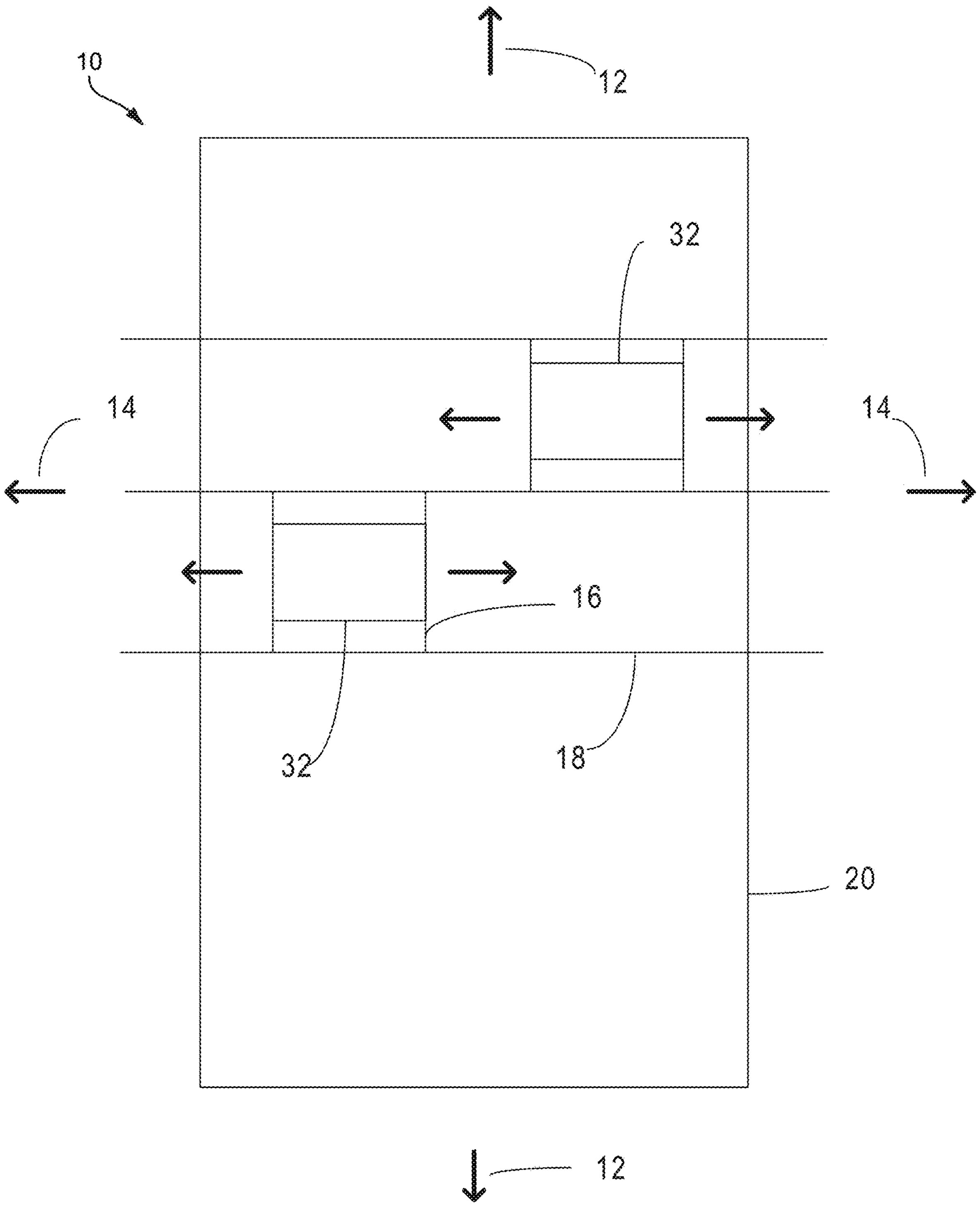
FIG. 1 is a top schematic diagram of an exemplary system as disclosed herein, depicting movement of scorching assemblies relative to a conveyor assembly of the system.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms “a,” “an” and “the” include plural referents unless the context clearly dictates otherwise. Thus, for example, reference to “a burner” or “a ventilation assembly” can include two or more such burners or ventilation assemblies unless the context indicates otherwise.

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It will be further understood that the endpoints of each of the ranges are significant both in relation to the other endpoint, and independently of the other endpoint. Optionally, in some aspects, when values are approximated by use of the antecedent “about” or “substantially,” it is contemplated that values within up to 15%, up to 10%, or up to 5% (above or below) of the particularly stated value or characteristic can be included within the scope of those aspects.

As used herein, the terms “optional” or “optionally” mean that the subsequently described event or circumstance may or may not occur, and that the description includes instances where said event or circumstance occurs and instances where it does not.

As used herein, the term “scorching” refers to the application of one or more flames to a surface (such as, for example, a surface of a board or panel) to achieve a scorched, flamed, burned, incinerated, and/or Shou-Sugi-Ban look or appearance as is known in the art.

As used herein, the term “communicatively coupled” refers to a condition in which two components are capable of communicating with each other using any conventional wired or wireless communication protocol, including, without limitation, direct/cable connection, Wi-Fi connection, Bluetooth® connection, and the like.

The word “or” as used herein means any one member of a particular list and also includes any combination of members of that list.

Described herein are systems and methods for scorching boards or panels to produce a desired aesthetic appearance. As further described herein, the disclosed systems and methods can aesthetically modify the boards or panels without thermally modifying the material (and mechanical properties) of the boards or panels. Additionally, as further described herein, unlike conventional manual systems and methods that are limited to use with solid wood, the disclosed systems and methods can be used with any material, including synthetic, hybrid, or engineered woods, wood composites, fiber cement boards, and the like. In use, it is contemplated that the disclosed systems and methods can remove the human variables associated with the conventional processes of manually burning wood using a propane torch (by hand). It is further contemplated that the disclosed systems and methods can dramatically increase the productivity and efficiency of the scorching process while allowing for the creation of either consistent or random flamed appearances or textures, which can be selectively applied to materials used in flooring, siding, fencing, furniture, and other products that are conventionally constructed of wood or simulated wood. In particular, it is contemplated that the disclosed systems and methods can efficiently produce Shou-Sugi-Ban (and other similar) looks on boards and panels so that they can be mass produced at lower costs and with consistent looks. It is further contemplated that the disclosed systems can store recipes that increase the variety of available flamed looks while also minimizing or eliminating the need to re-work boards and panels that are charred or burned too heavily. In some embodiments, the system can process boards and panels at about ten to about twenty feet per minute, which can significantly increase output over hand scorching methods.

Systems for Scorching Boards or Panels

Described herein with reference to FIGS. 1-4 is a system for scorching boards or panels, including, for example and without limitation, boards or panels comprising solid wood, engineered wood, hybrid wood, wood composites (e.g., wood-plastic composites), fiber cement board, and combinations thereof. Following scorching of the boards or panels as disclosed herein, it is contemplated that the boards or panels can be used for floors, walls, roofs, furniture, cabinets, fences, moldings, and other architectural and building materials. More generally, it is contemplated that the disclosed boards and panels can be used in any application where it may be desirable for the boards and panels to have a scorched appearance as described herein. Images of exemplary boards that have been scorched as disclosed herein are provided in FIGS. 5A-5E.

In exemplary aspects, the system 10 can comprise a conveyor assembly 20. In these aspects, the conveyor assembly 20 can comprise a conveyor 22 configured to effect movement of at least one board 120 or panel relative to a movement axis 12. The conveyor 22 can be operatively coupled to a motor 26 (or other actuator) that is configured to selectively effect movement of the conveyor relative to the movement axis. In further aspects, the conveyor assembly 20 can comprise a processing unit 24 that is communicatively coupled to the motor 26 and configured to selectively control activation and operation of the motor (and, thus, the movement of the conveyor 22). In use, the processing unit 24 can be configured to selectively adjust a conveyor speed at which the conveyor 22 advances the at least one board or panel relative to the movement axis 12. Optionally, it is contemplated that the conveyor speed can range from about 10 to about 15 feet per minute; however, the use of other conveyor speeds is contemplated. In some embodiments, each roller can comprise a sprocket, and a motor-driven chain can engage each sprocket to turn each roller.

Figure 2:
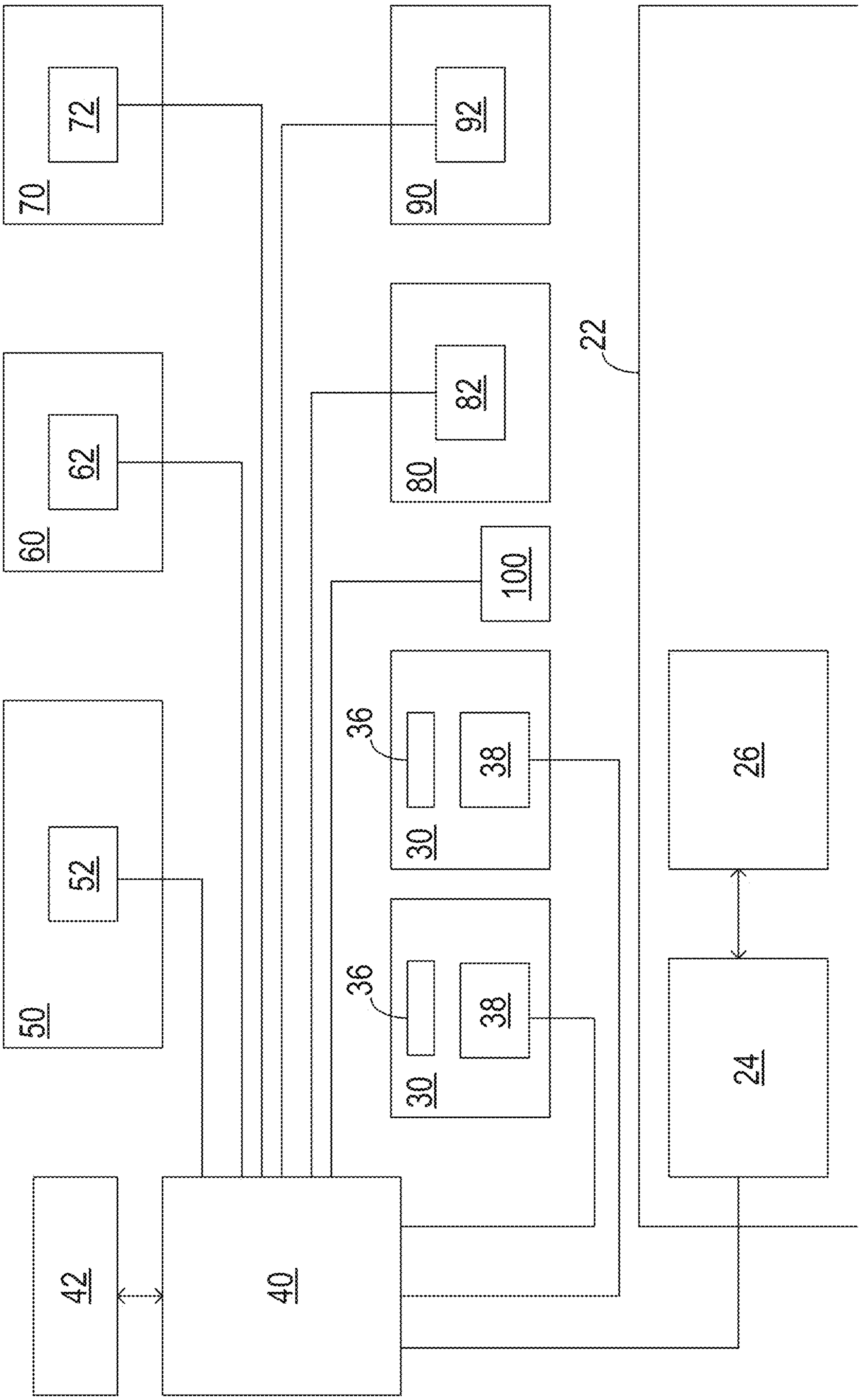
FIG. 2 is a schematic diagram depicting exemplary communication pathways within a system as disclosed herein.
Figure 3:
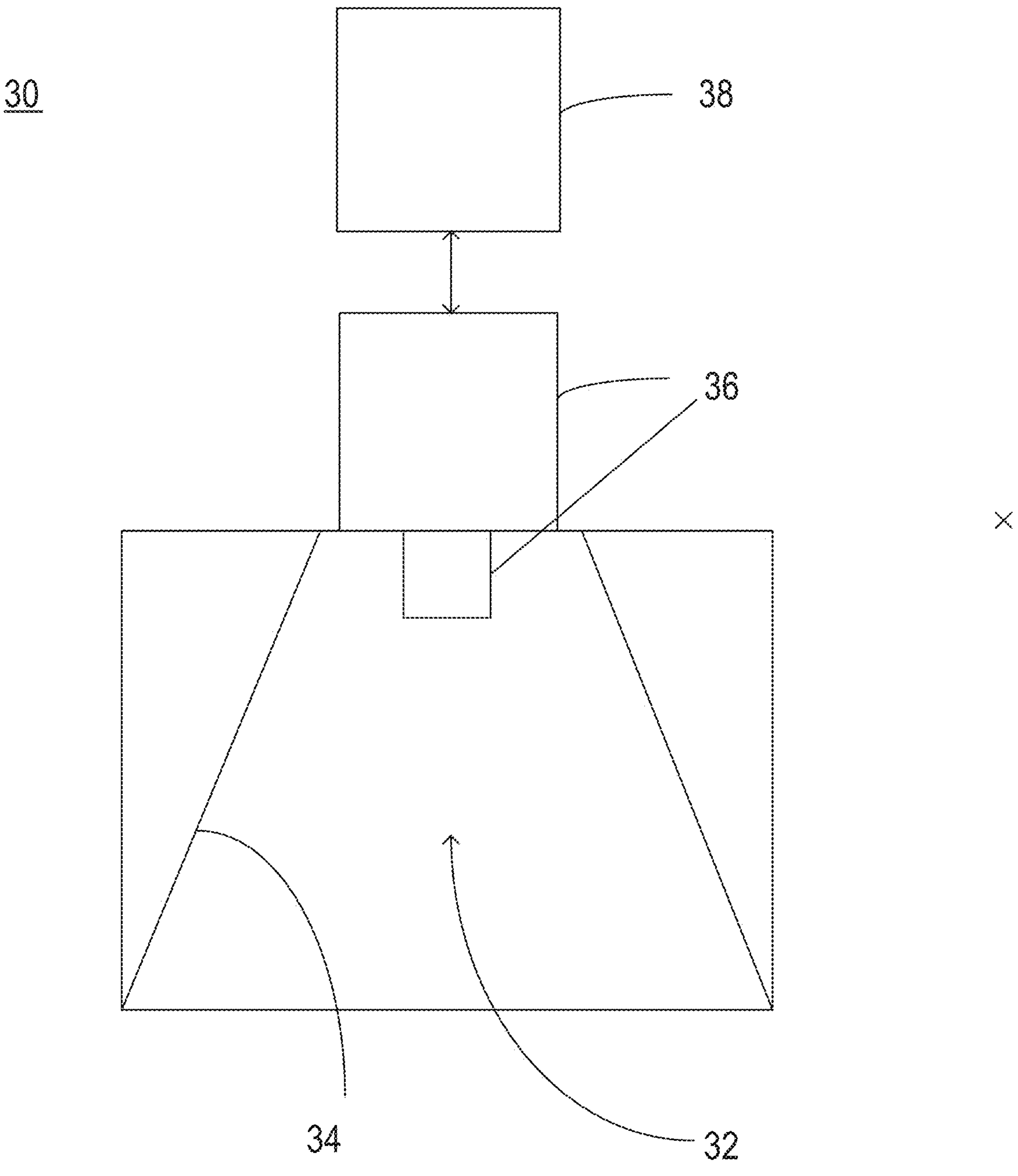
FIG. 3 is a partially transparent, side schematic diagram depicting an exemplary scorching assembly as disclosed herein.
Figure 4:
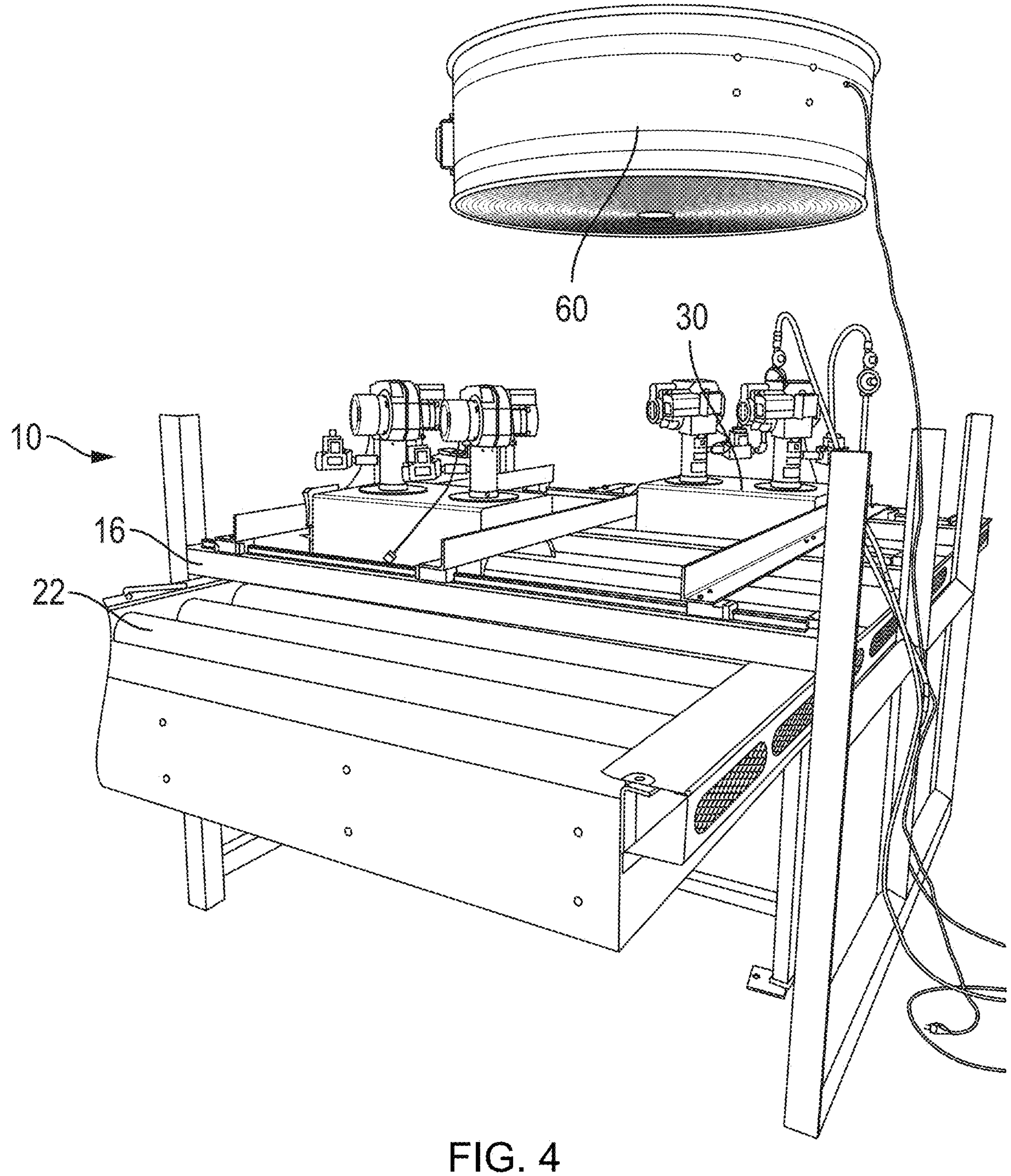
FIG. 4 is an image of an exemplary system as shown herein, showing a conveyor assembly, a scorching assembly having burners with air and propane inlet lines, a ventilation assembly, and a frame.

In additional aspects, the system 10 can comprise at least one scorching assembly 30 (optionally, a plurality of scorching assemblies). In these aspects, each scorching assembly 30 can comprise a combustion chamber 32 having an outer wall that defines an interior space. In further aspects, each scorching assembly 30 can further comprise at least one burner 36 mounted to the combustion chamber 32 and at least partially received within the interior space of the combustion chamber (optionally, through at least one opening in a top portion of the outer wall of the combustion chamber). In these aspects, the at least one burner 36 can be oriented toward the conveyor 22. In still further aspects, each scorching assembly can further comprise at least one processing unit 38 communicatively coupled to the at least one burner 36. In some aspects, each burner 36 can have one or more input lines for receiving air and a flammable gas such as propane. In these aspects, it is contemplated that the at least one processing unit can comprise or be communicatively coupled to an automated ignitor and/or valves that control the flow of air and gas through the respective input lines. In use, the at least one processing unit 38 can be configured to selectively control activation (turning on and off) and operation of the at least one burner 36. It is contemplated that the use of forced air within the combustion chambers can enhance burning in a way not achievable with a propane torch). In exemplary aspects, the at least one scorching assembly can comprise a first scorching assembly and a second scorching assembly as shown in FIGS. 1-2 and 4. In further exemplary aspects, it is contemplated that the disclosed burners 36 can have significantly higher thermal outputs (BTU amounts) in comparison to hand-held torches. For example, and without limitation, it is contemplated that the thermal output of the disclosed burners 36 can be about 250,000 BTUs; however, it is contemplated that this output can be selectively increased or decreased as desired.

In further exemplary aspects, the system 10 can comprise a central controller 40. In these aspects, the central controller 40 can be communicatively coupled to each processing unit 38 of the at least one scorching assembly 30. In these aspects, each processing unit 38 of each scorching assembly 30 can be configured to selectively modify a rate or volume of fuel or a rate or volume of air supplied to a corresponding burner 36 of the scorching assembly 30. Additionally, or alternatively, in other aspects, the central controller 40 can be communicatively coupled to the processing unit 24 of the conveyor assembly 20. In these aspects, the central controller 40 can be configured to receive a user input corresponding to a selected conveyor speed. In further exemplary aspects, the central controller 40 can be configured to receive a user input corresponding to a scorching profile for the at least one board or panel. Each of human-machine interface (HMI) "recipes," settings, tool paths, etc. can dictate the scorching profile provided by the system.

In exemplary aspects, the system 10 can comprise a frame 16 that is configured to support the at least one scorching assembly 30. Optionally, as shown in FIGS. 1 and 4, the frame 16 can at least partially overlie the conveyor 22. In further exemplary aspects, the frame 16 can define rails 18 to which the at least one scorching assembly 30 is movably coupled (optionally, through other portions of the frame) to thereby permit lateral movement of the scorching assemblies as disclosed further herein. Optionally, in further aspects, an operative height of each burner 36 of the at least one scorching assembly 30 can be selectively adjustable. In these aspects, it is contemplated that at least a portion of the frame 16 to which the scorching assembly 30 is secured can have a selectively adjustable height, thereby providing for adjustment of the operative height of the scorching assembly 30. Such adjustment of the height of the frame 16 can be accomplished using conventional manual mechanisms, including telescoping legs with locking pins and the like. In further embodiments, the burners can be positioned on threaded rods, and rotation of the threaded rods can adjust the position of the burners with respect to the boards/panels. In still further embodiments, the effect of changing the burner height can be replicated by adjusting the flame intensity via controlling the fuel and air to the burners. Additionally, or alternatively, it is contemplated that the frame 16 can be coupled to at least one hydraulic cylinder (optionally, a plurality of hydraulic cylinders) or other linear actuators (such as, for example, a ball screw or worm gear screw assembly) that are configured to selectively adjust vertical positioning of the frame (and, thus, the scorching assembly). Optionally, it is contemplated that the at least one hydraulic cylinder can be communicatively coupled to at least one corresponding processing unit that is configured to control activation and operation of the at least one hydraulic cylinder. In these aspects, it is contemplated that the processing unit(s) associated with the at least one hydraulic cylinder can be communicatively coupled to the central controller 40 to thereby permit central control of the height of the at least one scorching assembly 30 (in response to one or more inputs provided by a user or in order to achieve a particular scorching profile). Optionally, the height of the at least one scorching assembly 30 can be adjusted as a board passes thereunder on the conveyor 22.

In additional aspects, a position of at least one combustion chamber 32 (optionally, each combustion chamber 32) of the at least one scorching assembly 30 can be selectively adjustable relative to a transverse axis 14 that is perpendicular or substantially perpendicular to the movement axis 12. In these aspects, the combustion chamber 32 of at least one scorching assembly 30 (optionally, each scorching assembly) can be movably coupled to a portion of the frame 16 (optionally, rails 18) as discussed above. It is contemplated that the combustion chamber 32 of the at least one scorching assembly (optionally, each scorching assembly) can be operatively coupled to a linear actuator such as a hydraulic cylinder, servo motor, a motor connected to a tie rod (in the manner of a power-steering rack in a car or other vehicle), and the like that is configured to selectively effect movement and/or oscillation of the scorching assembly relative to the transverse axis 14. Optionally, servo motors can position the scorching assemblies relative to the transverse axis 14. In further embodiments, a tie rod on a cam can cyclically adjust the position of the scorching assemblies relative to the transverse axis 14. Optionally, it is contemplated that each linear actuator coupled to a scorching assembly can be communicatively coupled to a corresponding processing unit, which can be communicatively coupled to the central controller 40 to permit central control of the lateral movement of at least one scorching assembly. Although described above as permitting selective movement of the at least one scorching assembly 30 relative to the transverse axis 14, it is contemplated that the at least one scorching assembly can alternatively (or additionally) be configured for selective movement relative to the movement axis 12. Optionally, in exemplary aspects, when the at least one scorching assembly comprises a plurality of scorching assemblies, it is contemplated that the scorching assemblies can be spaced along the movement axis 12. In use, it is contemplated that one or more scorching assemblies 30 can be selectively moved relative to one or more of the transverse axis 14 and the movement axis 12 in accordance with a selected scorching profile to produce a desired aesthetic effect on the at least one board or panel. Optionally, each of the plurality of scorching assemblies can be moved relative to each other, vertically, relative to the transverse axis, and relative to the movement axis.

Optionally, in exemplary aspects, at least one scorching assembly 30 can further comprise at least one baffle 34 within the interior space of the combustion chamber 32 of the scorching assembly. In these aspects, the at least one baffle 34 can be configured to control a directional path of a flame produced by at least one burner 36 of the scorching assembly 30. In use, it is contemplated that the at least one baffle 34 can cooperate with the combustion chamber 32 of the corresponding scorching assembly 30 to limit spread of the flame relative to the movement axis 12. The baffles can be curved steel shields or hoods that limit lateral flame spread. Optionally, it is contemplated that a configuration of the at least one baffle or diffuser within the combustion chamber 32 can be selectively adjustable to control the distribution of the flame and/or limit flame spread. In some embodiments, the baffles can comprise a primary set of fixed baffles and an interchangeable set of secondary baffles. In further embodiments, the baffles can be pivotably adjustable to control the angle of the flame. For example, servo motors can rotate the baffles to change the angle at which the flame impinges on the board. In further embodiments, opposing baffles can pivot toward or away from each other to adjust the spread of the flame. One suitable example of a gas burner having a diffuser that is receivable within a combustion chamber as disclosed herein is the EZGas Pro™ gas burner manufactured by Carlin Combustion Technology, Inc. When baffles are provided, it is contemplated that the baffles can have a customized, user-selected shape produced by bending heat-resistant steel sheets to the selected shape and then welding the heat-resistant steel into place within the combustion chamber.

In further exemplary aspects, each burner 36 can comprise a respective nozzle that can be selectively removed and replaced with another nozzle (i.e., a nozzle having different dimensions or a different shape) to selectively modify the shape and size/spread of the flame generated by the burner. In some aspects, the system can be programmed so that an operator can select a nozzle type, and the system can provide certain "recipes" comprising various defined parameters (e.g., burner height, baffle angle, air/fuel delivery rate, etc.) based on the select nozzle type. In certain embodiments, based on the nozzle type, the operator can select between certain "recipes" that are compatible with the given nozzle.

In further exemplary aspects, the system 10 can comprise at least one fan assembly 50 (optionally, a plurality of fan assemblies) positioned vertically above the at least one scorching assembly 30. In these aspects, the at least one fan assembly 50 can be communicatively coupled to at least one processing unit 52 that is configured to selectively control operation of at least one fan assembly 50. It is contemplated that the at least one processing unit 52 can be communicatively coupled to the central controller 40, thereby permitting central and/or automated control of the activation and operation of the at least one fan assembly. Optionally, in exemplary aspects, each fan assembly 50 can comprise a large industrial fan as is known in the art. In use, it is contemplated that the at least one fan assembly can help cool the system to prevent too much heat from collecting overhead as disclosed herein. According to some aspects, the burners can increase their air/fuel flow when the fan is on to compensate for changes in airflow over the boards.

In still further exemplary aspects, the system 10 can comprise a ventilation assembly 60. In these aspects, the ventilation assembly can be communicatively coupled to a processing unit 62 that is configured to selectively control operation of the ventilation assembly 60. It is contemplated that the processing unit 62 can be communicatively coupled to the central controller 40, thereby permitting central and/or automated control of the activation and operation of the ventilation assembly. In exemplary aspects, the ventilation assembly 60 can comprise at least one exhaust hood (optionally, a plurality of exhaust hoods) that are configured to receive gas by-products of the scorching process disclosed herein. In use, it is contemplated that the ventilation assembly can be configured to pull fumes and soot away from the machine and machine operators.

It can be desirable to have separate systems for extraction of dust and soot from wire brushing and for burner exhaust. Accordingly, in still further exemplary aspects, the system 10 can comprise a dust/soot extraction assembly 70. In these aspects, the dust extraction assembly 70 can be communicatively coupled to a processing unit 72 that is configured to selectively control operation of the dust extraction assembly 70. It is contemplated that the processing unit 72 can be communicatively coupled to the central controller 40, thereby permitting central and/or automated control of the activation and operation of the dust extraction assembly 70. In exemplary aspects, the dust extraction assembly 70 can comprise a finishing machine having rotating brushes for deburring and cleaning. Exemplary finishing machines suitable for this purpose include those manufactured by Dubois Equipment Co. (Jasper, Indiana). Additionally, or alternatively, it is contemplated that the dust extraction assembly 70 can comprise dispenser or nozzle/jet subassemblies that are configured to deliver compressed air or water. When water jets are used, it is contemplated that the dust extraction assembly 70 can further comprise a squeegee-style vacuum to remove dirty water from the system. In use, it is contemplated that the dust extraction assembly 70 can prevent or decrease the amount of soot that is breathed in by workers. Thus, in use, it is contemplated that the soot extraction assembly can use compressed air, nylon brushes, suction, or combinations thereof to extract the soot. Optionally, it is contemplated that the dust/soot extraction assembly can be positioned in-line with the texturizing assembly as further disclosed herein (such that the soot extraction occurs sequentially following the texturizing steps disclosed herein).

In still further exemplary aspects, the system 10 can comprise at least one spray head 80 in fluid communication with a highlight or accent material (within a storage container). In these aspects, the at least one spray head can be configured to selectively spray highlights or accents on the at least one board or panel. In these aspects, the at least one spray head 80 can be communicatively coupled to a processing unit 82 that is configured to selectively control operation of the at least one spray head. It is contemplated that the processing unit 82 can be communicatively coupled to the central controller 40, thereby permitting central and/or automated control of the activation and operation of the at least one spray head 80. Optionally, in further exemplary aspects, it is contemplated that a spray head of the at least one spray head can be configured to spray flame-retardant materials or coatings to selected areas of a board or panel to prevent burning. For example, when tongue-and-groove or other edge profiles are provided on a board or panel, it can be helpful to cover portions of the edge profiles with flame-retardant coatings or treatments prior to scorching as disclosed herein. Flame retardant can further be applied to control the scorched look. In some embodiments, a first spray head can be positioned upstream of the burner assemblies for selectively spraying flame retardant onto portions of the wood. A second spray head downstream of the burners can apply primers and/or sealers onto the wood.

Figure 5A:
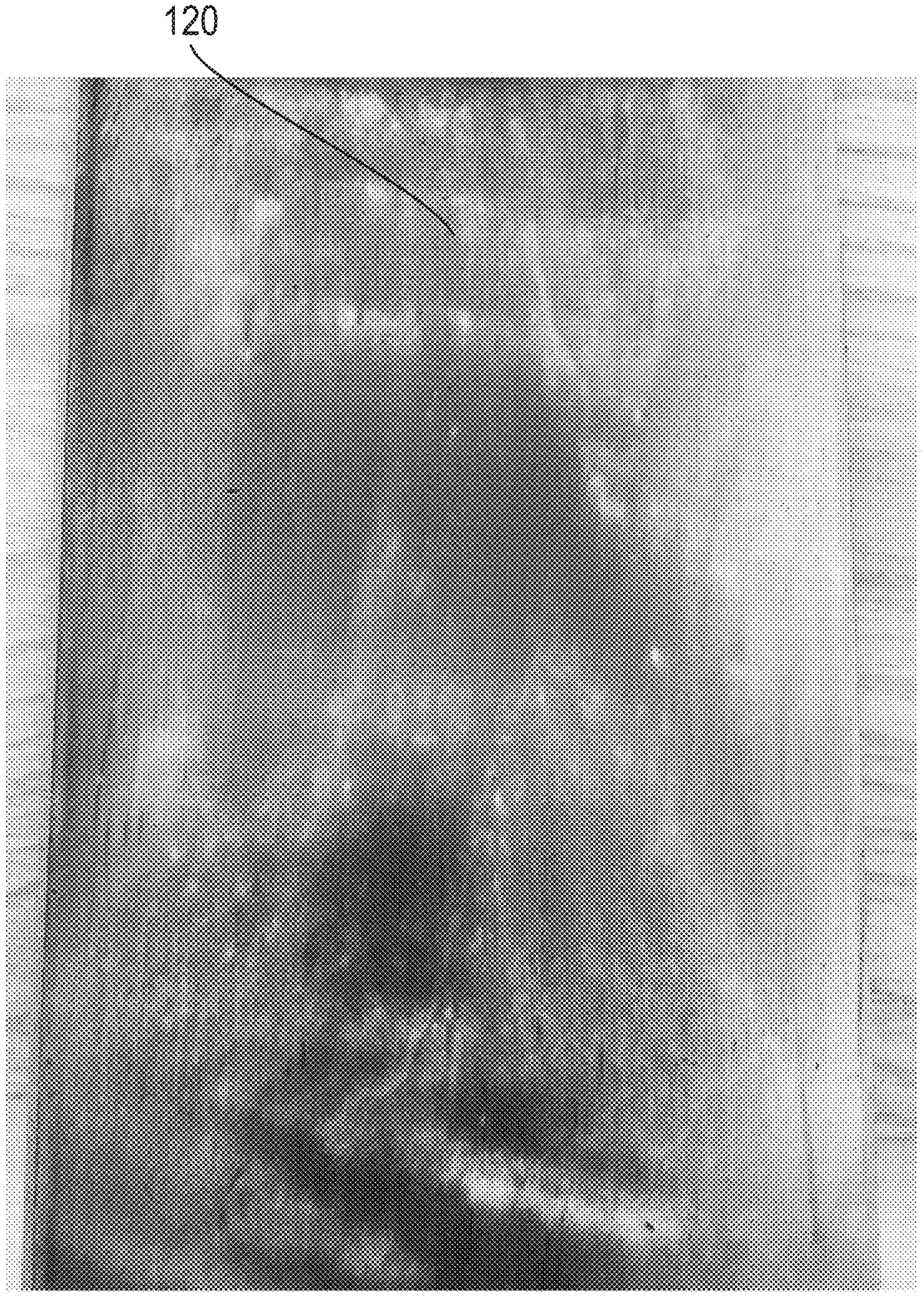
FIGS. 5A-5E are images depicting representative boards or panels that have been scorched using the systems and methods disclosed herein.
Figure 5B:
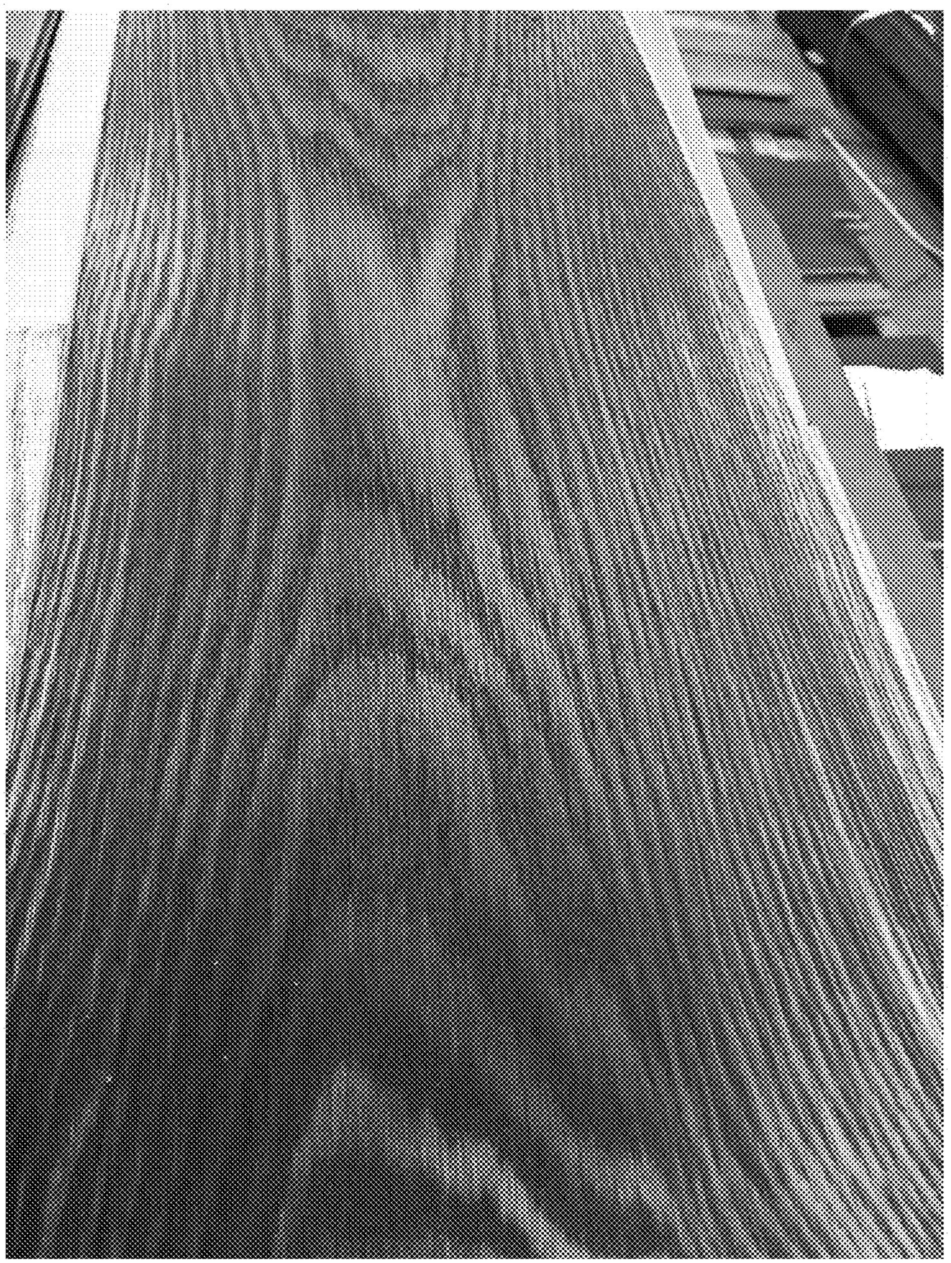
Figure 5C:
Figure 5D:
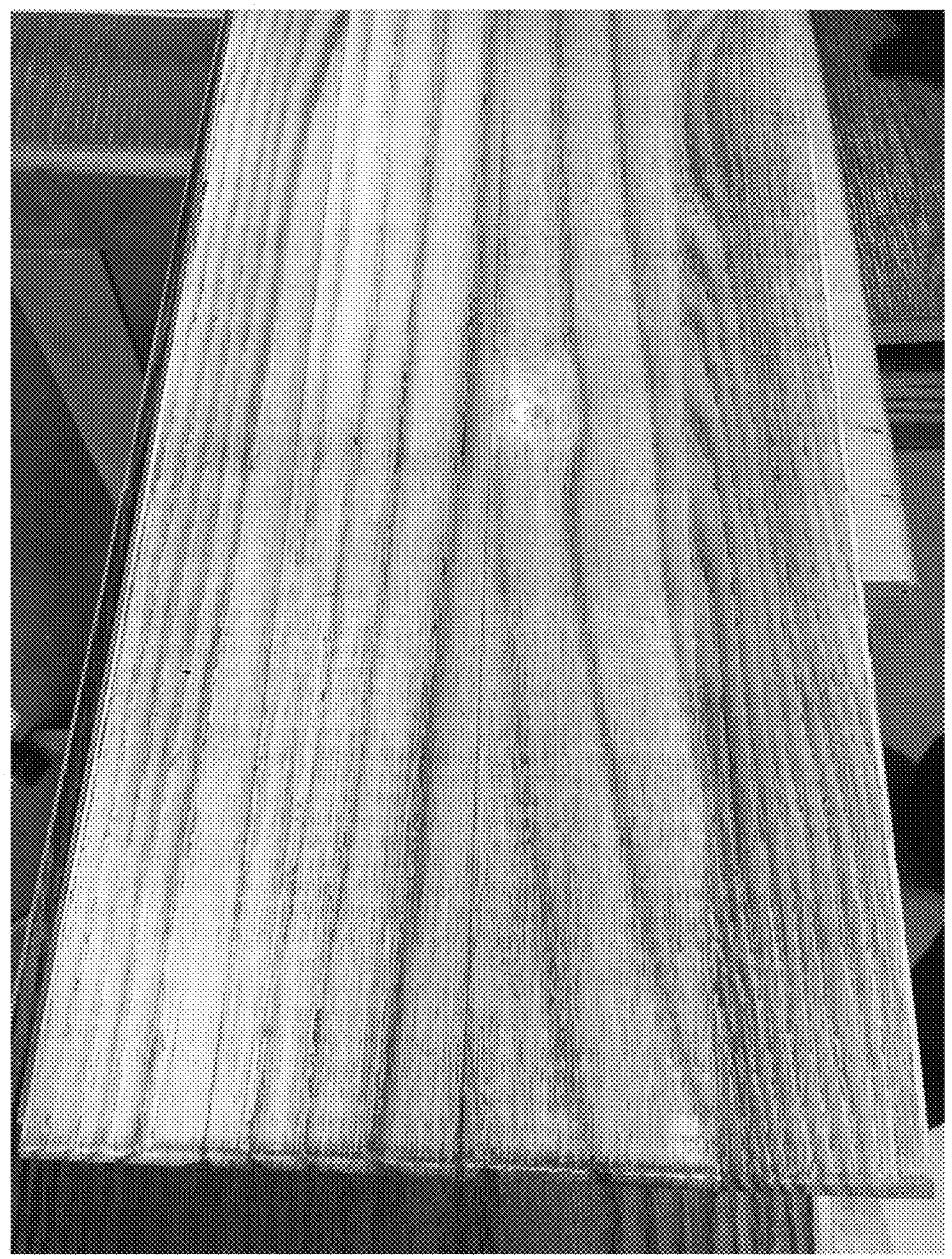
Figure 5E:

In still further aspects, the system can comprise at least one roller (not shown) that is configured to apply a finish to at least a portion of the at least one board or panel. In these aspects, it is contemplated that the at least one roller can be positioned either downstream or upstream of the burners 36 relative to the movement axis 12. In some aspects, at least one finish can be applied to the wood prior to scorching. For example, FIG. 5D depicts a board that was stained prior to scorching. However, it is understood that in most applications, such finishes will be applied subsequent to scorching of the at least one board or panel. Optionally, in exemplary aspects, a variable-frequency drive (VFD) coupled to a PLC can control feeding of panels or boards via belt or driven rollers. In these aspects, it is contemplated that the PLC/VFD can also control speed (RPMs) on rolls used to apply coatings/finishes as disclosed herein.

In still further aspects, the system 10 can comprise a texturizing assembly 90 that is configured to apply texture to the board or panel (either before or after scorching of the board or panel, or both before and after scorching of the board or panel). In these aspects, the texturizing assembly 90 can be communicatively coupled to a processing unit 92 that is configured to selectively control operation of the at least texturizing assembly. It is contemplated that the processing unit 92 can be communicatively coupled to the central controller 40, thereby permitting central and/or automated control of the activation and operation of the texturizing assembly. In exemplary aspects, the texturizing assembly 90 can comprise an automated distressing machine or wire brush machine. In these aspects, it is contemplated that the processing unit 92 can selectively adjust various operational parameters of the texturizing assembly 90, including, for example and without limitation, revolutions per minute, feed speed, and downward pressure. It is further contemplated that the brush types (wire, nylon, etc.) used in the wire brush machine (when provided) can be selectively changed. In some embodiments, the system can automatically set the brush settings (e.g., RPM, feed speed, and downward pressure) based on an operator inputting the type of brush into the HMI. Optionally, in exemplary aspects, it is contemplated that the texturizing assembly can be used in-line with the scorching assembly (sequentially following scorching) to remove softer scorched wood and promote adhesion of one or more coatings as further disclosed herein.

In these aspects, it is contemplated that the scorching profile produced by the central controller 40 (optionally, based on one or more user inputs) can correspond to a combination of user-specified or default or stored values for one or more scorching parameters, including, without limitation: type of wood, board size, board type, conveyor speed, transverse oscillating speed, flame size, flame intensity, flame duration, flame depth, scorching assembly (burner) position, application of stains/finishes before or after scorching, texturing (e.g., wire brush, contour sand, etc.) before or after scorching, and the like. Optionally, in exemplary aspects, the scorching profile can be configured to generate a random pattern, for example, via changes in burner position or settings during movement of the board or panel along the movement axis. Computer-generated algorithms can be generated using methods consistent with those disclosed in U.S. Pat. No. 10,071,456 to Rees et al., issued Sep. 11, 2018, the entirety of which is hereby incorporated by reference. In exemplary aspects, it is contemplated that the central controller 40, in response to a user selecting a randomized scorching profile, can be configured to randomly select various scorching parameter values (optionally, within predetermined operational ranges) to achieve the randomized scorching profile. For example, in these aspects, it is contemplated that the randomized scorching profile can be produced following random selection, by the central controller, of parameter values for one or more (optionally, a plurality or each) of the following scorching parameters: conveyor speed, transverse oscillating speed, flame size, flame intensity, flame duration, flame depth, scorching assembly (burner) position, application of stains/finishes before or after scorching, and texturing (e.g., wire brush, contour sand, etc.) before or after scorching.

In additional aspects, the system can comprise a memory 42 communicatively coupled to the central controller 40. In these aspects, it is contemplated that the memory can store a plurality of scorching profiles. It is further contemplated that the central controller 40 can be configured to receive a user input corresponding to a selection of a stored scorching profile. In response to receiving the user input, the central controller can be configured to initiate activation and operation of the disclosed system components (through communication with the disclosed processing units) to achieve the scorching profile corresponding to the user input. In further aspects, it is contemplated that the central controller 40 can be configured to store (or seek user input requesting storage of) randomized scorching profiles so that such profiles can be easily retrieved to reproduce a similar appearance on future boards or panels.

Optionally, in exemplary aspects, the central controller can be provided as a part of a computing device or other human-machine interface, such as, for example and without limitation, a desktop computer, a laptop computer, or a remote computing device, such as a tablet, a smartphone, and the like. The central controller can therefore include a display (optionally, a touchscreen display) or other user input devices, such as, for example and without limitation, a keyboard and/or dials that permit adjustment of scorching parameters as further disclosed herein. Optionally, in still further aspects, it is contemplated that at least a portion (optionally, all) of the processing units within the disclosed system comprise programmable logic controllers (PLCs).

In still further exemplary aspects, the system 10 can comprise at least one sensor 100 communicatively coupled to the central controller 40. In these aspects, it is contemplated that each sensor of the at least one sensor is selected from the group consisting of: a flame detection sensor or flame rod; a smoke detection sensor; and a high-temperature sensor. Exemplary flame rods include those made by Carlin Combustion Technology (for example, the Model 60200FR Gas Primary Control manufactured by Carlin Combustion Technology), which provide safety features such as activating the ignitor prior to gas valve opening, sensing flames and turning ignitor off if flame not detected or if preset time has expired, ensuring that the Carbon Monoxide detector is working when gas is turned on, and the like. An exemplary smoke detection sensor can be an ionization- and/or photoelectric-based smoke detection sensor. Optionally, the at least one sensor can comprise an air flow detection switch in front of the gas valve that can prevent air from being added to the gas unless combustion has already occurred. Optionally, the at least one sensor can comprise safety proximity switches on the conveyor that automatically shut off the burner if feeding stops for more than a preset time, thereby preventing the flame from continually scorching wood in the same spot and decreasing the chance of excessively burning the wood.

In use, the at least one sensor can be configured to produce one or more outputs that are received by the central controller 40. After the central controller 40 receives the outputs from the at least one sensor, the central controller can determine whether the current operation of the system violates or is inconsistent with predefined safety protocols (corresponding to threshold values for parameters monitored by the at least one sensor) and/or a previously selected scorching profile. Optionally, when the outputs from the at least one sensor indicate a violation or inconsistency, the central controller 40 can be configured to automatically communicate with one or more processing units to modify operation of the system to relieve or eliminate the violation or inconsistency. In some aspects, such modification can include completely stopping operation of the system by inactivating the various system components. In one non-limiting example, the at least one sensor 100 can comprise a temperature sensor, and the central controller can be configured to stop operation of the system when the temperature sensor detects a temperature exceeding a maximum temperature threshold. The flame and smoke detection sensors disclosed herein can likewise cause the central controller to stop operation when unsafe flame or smoke conditions are detected.

In still further exemplary aspects, it is contemplated that the system components can generally comprise heat-resistant materials (that do not melt in response to the conditions encountered during typical scorching procedures as disclosed herein). For example, it is contemplated that the conveyor 22, the frame 16, the combustion chambers 32, and the baffles 34 (when provided) can comprise heat-resistant materials.

In still further exemplary aspects, it is contemplated that the system can further comprise various safety equipment configured to eliminate or reduce the risk of dangerous conditions during operation of the system. For example and without limitation, it is contemplated that the system can comprise spark detection and extinguishing systems as are known in the art. It is contemplated that such systems can be communicatively coupled to the central controller 40 disclosed herein such that the central controller can deactivate some or all system components in response to an alarm condition detected by the spark detection and extinguishing system. Suitable examples of such spark detection and extinguishing systems are manufactured by Flamex Inc. (Greensboro, NC). As another example, it is contemplated that the system can comprise an overhead sprinkler system as is known in the art. It is contemplated that such sprinkler systems can be communicatively coupled to the central controller 40 such that the central controller can deactivate some or all system components in response to an alarm condition detected by the sprinkler system. As another example, the system can comprise a thermal imaging camera that is optionally communicatively coupled to the central controller 40 and can be used in combination with a temperature sensor as disclosed herein to detect conditions when the system should be deactivated in response to an undesirably high temperature. As another example, the system can comprise high and low gas cut-off valves that are optionally communicatively coupled to the central controller 40 and configured to detect conditions when the gas supply is undesirably high or low.

Methods for Scorching Boards or Panels

A method of scorching at least one board or panel can be performed using the systems disclosed herein. In exemplary aspects, the method can comprise loading or positioning the at least one board or panel on the conveyor of the conveyor assembly as disclosed herein. Boards and panels can be placed on the conveyor via a pick and place robot or transferred from another conveyor belt/roller. According to some aspects, the boards and panels can be manually aligned with the movement axis and positioned on the conveyor with respect to the transverse axis. In further aspects, a vertical surface can engage an edge of the boards/panels to align and position the boards/panels. In these aspects, the method can further comprise receiving, using the central controller, at least one input corresponding to a selected scorching profile for the at least one board or panel. Optionally, the at least one input can comprise a plurality of inputs corresponding to respective parameters that are combined by the central controller to produce a scorching profile. Alternatively, the at least one input can comprise one or more inputs corresponding to a selection of a stored scorching profile or parameter. In still further alternative aspects, the at least one input can comprise an instruction for the central controller to randomly generate a scorching profile as further disclosed herein.

Optionally, the method can comprise sequentially scorching at least two boards or panels using the same scorching profile.

Optionally, the method can comprise simultaneously scorching at least two boards or panels using a single scorching profile designed for both boards or panels.

Optionally, a first board or panel can be scorched using a first scorching profile, and a second board or panel can be scorched using a second scorching profile that differs from the first scorching profile. In exemplary aspects, the second scorching profile comprises a different positional arrangement of burners than the first scorching profile. Optionally, in these aspects, at least one burner has a different vertical position in the second scorching profile than in the first scorching profile. Additionally or alternatively, at least one burner can have a different horizontal position in the second scorching profile than in the first scorching profile. Additionally or alternatively, it is contemplated that the second scorching profile can comprise different fuel or air supply settings for at least one burner to modify flame size/spread or intensity (by, for example, modifying the amount of fuel and/or air and the nozzle type). Thus, it is contemplated that the second scorching profile can produce a different flame spread or flame intensity than the first scorching profile. Optionally, both the first profile and the second profile can be randomized as further disclosed herein.

Although methods of sequentially scorching two boards or panels are disclosed herein, it should be understood that the same methods can be repeated to scorch additional board or panels using either the same or different scorching profiles.

In further exemplary aspects, and as disclosed herein, at least one scorching assembly can comprise at least one baffle within the combustion chamber of the scorching assembly, with the at least one baffle controlling a directional path of a flame produced by at least one burner of the scorching assembly. In these aspects, it is contemplated that the first and second scorching profiles can be produced using respective first and second baffle configurations, with the second baffle configuration being different than the first baffle configuration.

Optionally, in the disclosed methods, and as further described herein, each board or panel can comprise, without limitation, solid wood, engineered wood, hybrid wood, a wood composite, or fiber cement board. In exemplary aspects, the board or panel can comprise engineered wood having a thin face (e.g., about 1 mm) veneer, and the scorching profile can have a flame depth and flame size that is configured to avoid burning completely through the thin face veneer. In further exemplary aspects, it is contemplated that the board or panel can be a 48-inch panel as is known in the art.

Optionally, in the disclosed methods, the board or panel can comprise at least one edge profile (e.g., a tongue-and-groove edge profile) configured to permit joining with at least one other board or panel. In exemplary aspects, it is contemplated that the scorching profile can be selected to avoid damage or alteration to the shape of such edge profiles.

Optionally, the method can comprise applying a finish to the at least one board or panel. Exemplary finishes include a lacquer, a wax, a urethane, or combinations thereof. Optionally, the finish can be applied using a roller as is known in the art.

Exemplary Aspects

In view of the described devices, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A system comprising: a conveyor assembly comprising a conveyor configured to effect movement of at least one board or panel relative to a movement axis; at least one scorching assembly, each scorching assembly comprising: a combustion chamber; at least one burner mounted to the combustion chamber and at least partially received within the combustion chamber, wherein the at least one burner is oriented toward the conveyor, and wherein each burner; and at least one processing unit communicatively coupled to the at least one burner, wherein the at least one processing unit is configured to selectively control activation and operation of the at least one burner; and a central controller communicatively coupled to each processing unit of the at least one scorching assembly, wherein the central controller is configured to receive a user input corresponding to a scorching profile for the at least one board or panel.

Aspect 2: The system of aspect 1, wherein the at least one scorching assembly comprises a plurality of scorching assemblies.

Aspect 3: The system of aspect 1 or aspect 2, wherein each processing unit of each scorching assembly is configured to selectively modify a rate or volume of fuel or a rate or volume of air supplied to a corresponding burner of the scorching assembly.

Aspect 4: The system of any one of the preceding aspects, wherein an operative height of each burner of the at least one scorching assembly is selectively adjustable.

Aspect 5: The system of any one of the preceding aspects, wherein a position of at least one combustion chamber of the at least one scorching assembly is selectively adjustable relative to a transverse axis that is perpendicular or substantially perpendicular to the movement axis.

Aspect 6: The system of any one of the preceding aspects, wherein at least one scorching assembly further comprises at least one baffle within the combustion chamber of the scorching assembly, wherein the at least one baffle is configured to control a directional path of a flame produced by at least one burner of the scorching assembly.

Aspect 7: The system of aspect 6, wherein the at least one baffle cooperates with the combustion chamber of the corresponding scorching assembly to limit spread of the flame relative to the movement axis.

Aspect 8: The system of any one of the preceding aspects, wherein the conveyor assembly further comprises a processing unit communicatively coupled to the conveyor, wherein the processing unit is configured to selectively adjust a conveyor speed at which the conveyor advances the at least one board or panel relative to the movement axis, wherein the central controller is communicatively coupled to the processing unit of the conveyor assembly.

Aspect 9: The system of aspect 8, wherein the central controller is configured to receive a user input corresponding to a selected conveyor speed.

Aspect 10: The system of any one of the preceding aspects, further comprising at least one fan assembly positioned vertically above the at least one scorching assembly.

Aspect 11: The system of any one of the preceding aspects, further comprising a ventilation assembly.

Aspect 12: The system of aspect 11, further comprising a dust extraction assembly.

Aspect 13: The system of any one of the preceding aspects, further comprising a spray head in fluid communication with a highlight or accent material, wherein the spray head is configured to selectively spray highlights or accents on the at least one board or panel.

Aspect 14: The system of any one of the preceding aspects, further comprising a memory communicatively coupled to the central controller, wherein the memory stores a plurality of scorching profiles, and wherein the central controller is configured to receive a user input corresponding to a selection of a stored scorching profile.

Aspect 15: The system of any one of the preceding aspects, wherein the central controller is provided as a part of a computing device, and wherein the processing units within the system comprise programmable logic controllers.

Aspect 16: The system of any one of the preceding aspects, further comprising a texturizing assembly communicatively coupled to the central controller, wherein the texturizing assembly is configured to apply texture to the board or panel.

Aspect 17: The system of any one of the preceding aspects, wherein the conveyor assembly comprises heat-resistant materials.

Aspect 18: The system of any one of the preceding aspects, further comprising at least one sensor communicatively coupled to the central controller, wherein each sensor of the at least one sensor is selected from the group consisting of: a flame detection sensor; a smoke detection sensor; and a temperature sensor.

Aspect 19: The system of aspect 18, wherein the at least one sensor comprises a temperature sensor, and wherein the central controller is configured to stop operation of the system when the temperature sensor detects a temperature exceeding a maximum temperature threshold.

Aspect 20: A method of scorching at least one board or panel using the system of any one of the preceding aspects.

Aspect 21: The method of aspect 20, further comprising applying a finish to the at least one board or panel.

Aspect 22: The method of aspect 21, wherein the finish is a lacquer, a wax, a urethane, or combinations thereof.

Aspect 23: The method of aspect 20, wherein at least two boards or panels are sequentially scorched using the same scorching profile.

Aspect 24: The method of aspect 20, wherein a first board or panel is scorched using a first scorching profile, and wherein a second board or panel is scorched using a second scorching profile.

Aspect 25: The method of aspect 24, wherein the second scorching profile comprises a different positional arrangement of burners than the first scorching profile.

Aspect 26: The method of aspect 25, wherein at least one burner has a different vertical position in the second scorching profile than in the first scorching profile.

Aspect 27: The method of aspect 26, wherein at least one burner has a different horizontal position in the second scorching profile than in the first scorching profile.

Aspect 28: The method of any one of aspects 24-27, wherein the second scorching profile comprises different fuel or air supply settings for at least one burner.

Aspect 29: The method of any one of aspects 24-28, wherein the second scorching profile produces a different flame spread or flame intensity than the first scorching profile.

Aspect 30: The method of any one of aspects 24-29, wherein at least one scorching assembly comprises at least one baffle within the combustion chamber of the scorching assembly, wherein the at least one baffle controls a directional path of a flame produced by at least one burner of the scorching assembly, wherein the first and second scorching profiles are produced using respective first and second baffle configurations, and wherein the second baffle configuration is different than the first baffle configuration.

Aspect 31: The method of any one of the preceding aspects, wherein the board or panel comprises solid wood.

Aspect 32: The method of any one of the preceding aspects, wherein the board or panel comprises engineered wood.

Aspect 33: The method of any one of the preceding aspects, wherein the board or panel comprises hybrid wood.

Aspect 34: The method of any one of the preceding aspects, wherein the board or panel comprises a wood composite.

Aspect 35: The method of any one of the preceding aspects, wherein the board or panel comprises fiber cement board.

Aspect 36: The method of any one of the preceding aspects, wherein the board or panel comprises at least one edge profile configured to permit joining with at least one other board or panel.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A system comprising:

a conveyor assembly comprising a conveyor configured to effect movement of at least one board or panel relative to a movement axis;

at least one scorching assembly, each scorching assembly comprising:

a combustion chamber;

at least one burner mounted to the combustion chamber and at least partially received within the combustion chamber, wherein the at least one burner is oriented toward the conveyor, and at least one processing unit communicatively coupled to the at least one burner, wherein the at least one processing unit is configured to selectively control activation and operation of the at least one burner; and a first spray head positioned along the movement axis upstream of the at least one burner along the conveyor assembly, wherein the first spray head is configured to selectively spray flame retardant onto only portions of the board or panel to control a scorching profile applied to the at least one board.

2. The system of claim 1, further comprising:

a central controller communicatively coupled to each processing unit of the at least one scorching assembly, wherein the central controller is configured to receive a user input corresponding to a scorching profile for the at least one board or panel.

3. The system of claim 2, further comprising a memory communicatively coupled to the central controller, wherein the memory stores a plurality of scorching profiles, and wherein the central controller is configured to receive a user input corresponding to a selection of a stored scorching profile.

4. The system of claim 2, further comprising a temperature sensor, wherein the central controller is configured to stop operation of the system when the temperature sensor detects a temperature exceeding a maximum temperature threshold.

5. The system of claim 2, further comprising at least one of the following sensors:

a flame detection sensor that is configured to shut off fuel to an ignitor of the at least one burner when (a) a flame is not detected following activation of the ignitor or (b) a preset time has expired; or a smoke detection sensor, wherein the central controller is configured to stop operation of the system when the smoke detection sensor detects a presence of smoke.

6. The system of claim 2, wherein the scorching profile comprises at least one randomized parameter.

7. The system of claim 6, wherein the at least one randomized parameter is associated with at least one of conveyor speed, transverse oscillating speed, flame size, flame intensity, flame duration, flame depth, or position of the at least one burner.

8. The system of claim 2, wherein the scorching profile comprises a change in at least one parameter while the at least one board or panel is below at least one of the at least one burner, wherein the change in the at least one parameter comprises a change in conveyor speed, transverse oscillating speed, flame size, flame intensity, flame duration, flame depth, or position of the at least one burner.

9. The system of claim 1, wherein the at least one scorching assembly comprises a plurality of scorching assemblies.

10. The system of claim 9, wherein each processing unit of each scorching assembly is configured to selectively modify a rate or volume of fuel or a rate or volume of air supplied to a corresponding burner of the scorching assembly.

11. The system of claim 1, wherein an operative height of each burner of the at least one scorching assembly is selectively adjustable.

12. The system of claim 1, wherein a position of at least one combustion chamber of the at least one scorching assembly is selectively adjustable relative to a transverse axis that is perpendicular or substantially perpendicular to the movement axis.

13. The system of claim 1, wherein at least one scorching assembly further comprises at least one baffle within the combustion chamber of the scorching assembly, wherein the at least one baffle is configured to control a directional path of a flame produced by at least one burner of the scorching assembly.

14. The system of claim 13, wherein the at least one baffle cooperates with the combustion chamber of the corresponding scorching assembly to limit spread of the flame relative to the movement axis.

15. A method comprising:

scorching at least one board or panel with a system comprising:

a conveyor assembly comprising a conveyor configured to effect movement of at least one board or panel relative to a movement axis;

at least one scorching assembly, each scorching assembly comprising:

a combustion chamber;

at least one burner mounted to the combustion chamber and at least partially received within the combustion chamber, wherein the at least one burner is oriented toward the conveyor, and at least one processing unit communicatively coupled to the at least one burner, wherein the at least one processing unit is configured to selectively control activation and operation of the at least one burner; and spraying, by a first spray head positioned upstream of the at least one scorching assembly along the movement axis, flame retardant onto only portions of the board or panel to control a scorching profile applied to the at least one board.

16. The method of claim 15, further comprising receiving, by a central controller communicatively coupled to each processing unit of the at least one scorching assembly, a user input corresponding to the scorching profile.

17. The method of claim 15, wherein at least two boards or panels are sequentially scorched using the same scorching profile.

18. The method of claim 15, wherein a first board or panel is scorched using a first scorching profile, and wherein a second board or panel is scorched using a second scorching profile.

19. The method of claim 18, wherein the second scorching profile comprises a different positional arrangement of burners than the first scorching profile.

20. The method of claim 15, wherein the first and second scorching profiles are randomly generated by a central controller that is communicatively coupled to each processing unit of the at least one scorching assembly.

* * * * *